United States Patent
Yan et al.

(10) Patent No.: US 10,978,885 B2
(45) Date of Patent: Apr. 13, 2021

(54) SYSTEMS AND METHODS FOR CAPACITOR MODULE BALANCING AND MAINTENANCE

(71) Applicant: Maxwell Technologies, Inc., San Diego, CA (US)

(72) Inventors: Rong Yan, San Diego, CA (US); Ulf Carl Mikael Setterberg, San Diego, CA (US); Liesel Mathew Chiriyankandath, San Diego, CA (US); Christopher James, San Diego, CA (US); Magnus Lindbäck, San Diego, CA (US); Robert Shaw Lynds, La Mesa, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 417 days.

(21) Appl. No.: 15/880,258

(22) Filed: Jan. 25, 2018

(65) Prior Publication Data
US 2018/0212442 A1 Jul. 26, 2018

Related U.S. Application Data

(60) Provisional application No. 62/450,501, filed on Jan. 25, 2017.

(51) Int. Cl.
*H02J 7/00* (2006.01)

(52) U.S. Cl.
CPC .......... *H02J 7/0016* (2013.01); *H02J 7/0014* (2013.01)

(58) Field of Classification Search
CPC ...... H02J 7/0016; H02J 7/0014; H02J 7/0021; H02J 7/0022; H02J 7/0027

USPC .......................................................... 320/166
See application file for complete search history.

(56) References Cited

U.S. PATENT DOCUMENTS

| | | | | |
|---|---|---|---|---|
| 5,656,915 | A * | 8/1997 | Eaves | H01M 10/482 320/118 |
| 6,406,805 | B1 * | 6/2002 | James | H01M 8/0258 429/445 |
| 9,037,424 | B2 * | 5/2015 | Dos Santos Ramos | G01R 31/64 702/59 |
| 9,088,162 | B2 * | 7/2015 | Shu | H02J 7/0021 |
| 9,209,653 | B2 | 12/2015 | Maynard et al. | |
| 9,219,367 | B2 * | 12/2015 | Tsai | H02J 7/0014 |
| 9,770,997 | B2 * | 9/2017 | Lin | B60L 58/22 |

(Continued)

FOREIGN PATENT DOCUMENTS

| | | |
|---|---|---|
| EP | 2709201 | 3/2014 |
| WO | WO 2012/006115 A2 | 1/2012 |

*Primary Examiner* — M Baye Diao
(74) *Attorney, Agent, or Firm* — Knobbe, Martens, Olson & Bear, LLP

(57) ABSTRACT

In one aspect, the invention comprises an apparatus for balancing cells in a series string of modules having cells. The apparatus comprises a processing system and a communication circuit. The processing circuit is configured to receive an average cell voltage value from each module. The processing circuit is further configured to determine an overall average cell voltage for all the cells. The processing circuit is also configured to cause each the modules to determine a relative capacitance for each of its cells and cause each of the modules to balance its cells based on the respective relative capacitances. The communication circuit is configured to receive the average cell voltage value from the modules.

18 Claims, 7 Drawing Sheets

(56) References Cited

U.S. PATENT DOCUMENTS

| | | | |
|---|---|---|---|
| 9,847,654 B2* | 12/2017 | Beaston | H02J 7/342 |
| 10,270,266 B2* | 4/2019 | Beaston | H02J 7/0047 |
| 2007/0080662 A1* | 4/2007 | Wu | B60L 58/14 |
| | | | 320/110 |
| 2008/0233469 A1* | 9/2008 | Drozdz | H01M 2/1072 |
| | | | 429/61 |
| 2011/0204722 A1* | 8/2011 | Kim | H02J 7/0016 |
| | | | 307/77 |
| 2013/0043840 A1 | 2/2013 | Bylsma et al. | |
| 2013/0093400 A1 | 4/2013 | Maynard et al. | |
| 2013/0106360 A1 | 5/2013 | Gaylo et al. | |
| 2014/0042974 A1 | 2/2014 | Yang et al. | |
| 2016/0043578 A1 | 2/2016 | Miyamoto et al. | |

* cited by examiner

SYSTEMS AND METHODS FOR CAPACITOR MODULE BALANCING AND MAINTENANCE

CROSS-REFERENCE TO RELATED APPLICATIONS

This Application claims the benefit of U.S. Provisional Application No. 62/450,501, filed Jan. 25, 2017, and entitled "SYSTEMS AND METHODS FOR CAPACITOR MODULE BALANCING AND MAINTENANCE" and assigned to the assignee hereof. The disclosure of this prior application is considered part of this application, and is hereby incorporated by reference in its entirety.

BACKGROUND

Field

The present disclosure relates generally to energy storage devices and systems, such as capacitor modules and systems, including ultra-capacitors and super-capacitors, and in particular, capacitor modules deployed in high voltage series configurations, each module containing some number of capacitor cells and coupled to some number of other modules.

Description of the Related Art

Various systems and techniques exist for balancing the voltage of individual cells in an energy storage system by discharging an excess cell voltage. However, prior approaches do not fully and efficiently dissipate excess cell voltage of cells in each of a series of coupled modules.

A capacitor's charge and voltage is proportional to its capacitance value. Accordingly, any energy storage system using multiple capacitors in a series configuration may encounter voltage imbalance problems caused, at least in part, by capacitance differences between the multiple capacitors. Capacitance differences between capacitors may result from production variations, aging, etc., of the specific capacitors. Few balancing systems exist to balance voltages of capacitor-based systems in operation. However, none of those systems is capable of balancing a capacitor module to another capacitor module at high voltages. Additionally, none of those systems is capable of fully discharging individual cells across multiple modules when the series configuration of capacitor modules is discharged to zero volts. In such a discharge, while the entire series of capacitor modules may have a measured voltage of zero volts, individual cells in one or more modules may maintain a positive or negative charge so long as there is an equal and opposite charge in the same or a different module to balance it. For example, a three-capacitor (or cell) module may have a measured charge of zero volts but one of the capacitors in the module may have a −1 volt (V) charge while the other two capacitors have a 0.5 V charge. Thus, the individual capacitors may maintain a charge while the module measures at zero charge. Such an imbalance of individual capacitors may be caused in part by imbalances between the capacitances of the capacitors. Accordingly, systems and methods for handling such scenarios are desired.

SUMMARY

Embodiments disclosed herein address the above-mentioned problems with prior art. The systems, methods and devices of this disclosure each have several innovative aspects, no single one of which is solely responsible for the desirable attributes disclosed herein.

Various embodiments of methods and devices within the scope of the appended claims each have several aspects, no single one of which is solely responsible for the desirable attributes described herein. Without limiting the scope of the appended claims, some prominent features are described herein.

In one aspect, an embodiment of this invention comprises an apparatus for balancing cells in a string of modules each having one or more cells. The apparatus comprises a processing system and a communication circuit. The processing system is configured to receive an average cell voltage value from each of a plurality of modules. The processing system is also configured to determine an overall average cell voltage for the plurality of modules. The processing system is additional configured to cause each of the plurality of modules to determine a relative capacitance for each of its cells based on the overall average cell voltage. The processing system is further configured to cause each of the plurality of modules to balance its cells based on the respective relative capacitances for each of the cells of the module. The communication circuit is configured to receive the average cell voltage value from each of the plurality of modules.

In another aspect, an embodiment of this invention comprises a method of balancing cells in a string of a plurality of modules each comprising one or more cells. The method comprises receiving an average cell voltage value from each of the plurality of modules. The method also comprises determining an overall average cell voltage for the plurality of modules. The method further comprises causing each of the plurality of modules to determine a relative capacitance for each of its cells based on the overall average cell voltage. The method additionally comprises causing each of the plurality of modules to balance its cells based on the respective relative capacitances for each of the cells of the module.

In another aspect, an embodiment of this invention comprises a non-transitory computer readable medium comprising instructions stored thereon that when executed by at least one processor of a computing device cause the computing device to receive an average cell voltage value from each of a plurality of modules arranged in a string, each of the plurality of modules comprising one or more cells. The instructions further cause the computing device to determine an overall average cell voltage for the plurality of modules. The instructions additionally cause the computing device to cause each of the plurality of modules to determine a relative capacitance for each of its cells. The instructions also cause the computing device to cause each of the plurality of modules to balance its cells based on the respective relative capacitances for each of its cells.

BRIEF DESCRIPTION OF THE DRAWINGS

Details of one or more embodiments of the subject matter described in this disclosure are set forth in the accompanying drawings and the description below. Although the examples provided in this disclosure are sometimes described in terms of capacitors or capacitor cells, the concepts provided herein may apply to other types of energy storage systems. Other features, aspects, and advantages will become apparent from the description, the drawings and the claims. Note that the relative dimensions of the following figures may not be drawn to scale.

DETAILED DESCRIPTION

Figure 1:
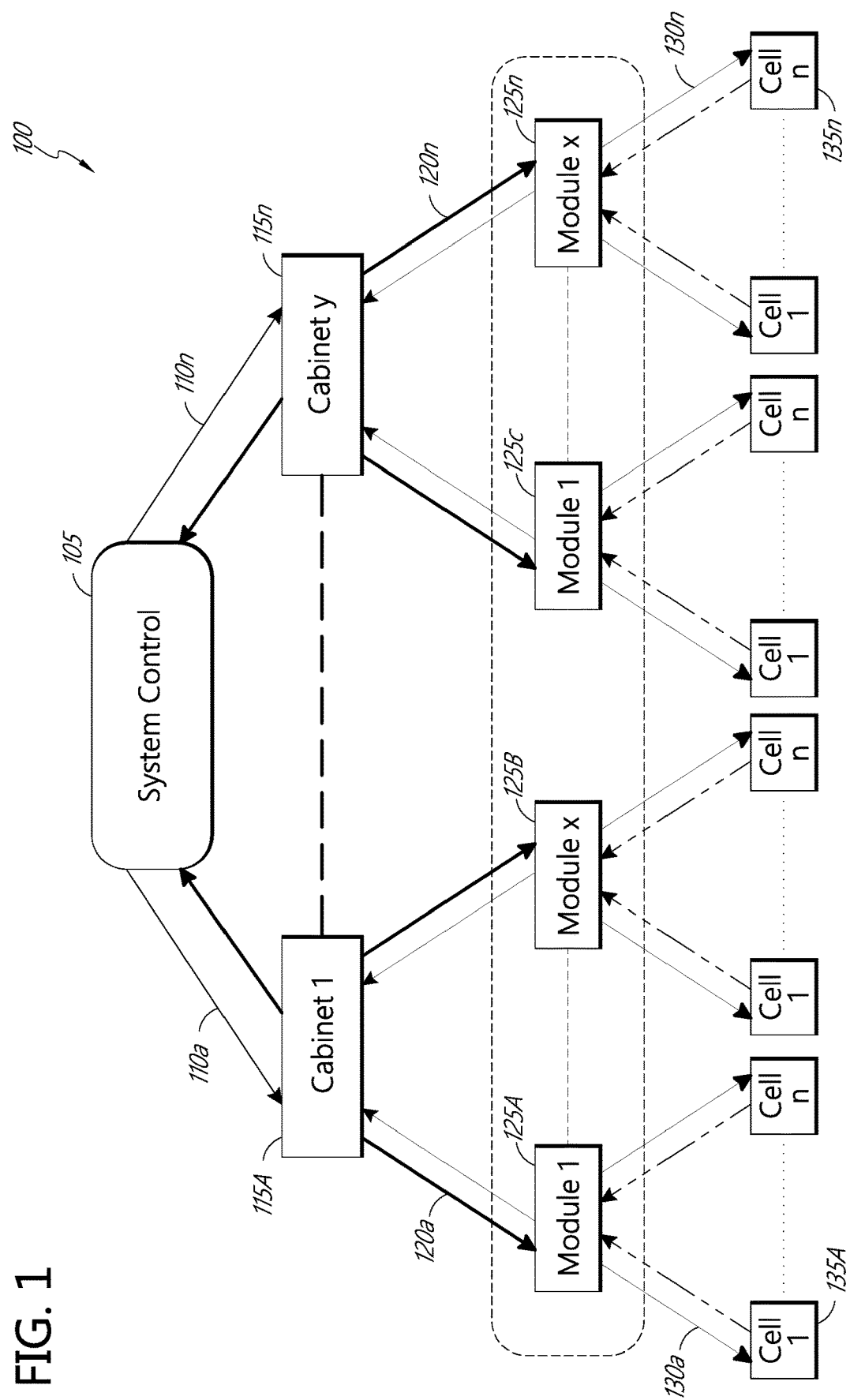
FIG. 1 illustrates a hierarchical control and communication structure for components of a system including a series coupled string of capacitor modules arranged in cabinets and controlled by a system controller, in accordance with an embodiment.

The detailed description set forth below in connection with the appended drawings is intended as a description of exemplary embodiments and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specified details for the purpose of providing a thorough understanding of the exemplary embodiments. In some instances, some devices are shown in block diagram form.

Energy storage systems can include a plurality of individual capacitor cells arranged in series to form an energy storage module or bank, which has a higher voltage output than an individual cell. The modules in turn can be connected in series with other modules to output higher combined voltages. The individual capacitors of a module are sometimes referred to as capacitor cells, or more generally, cells. In some embodiments, the cells of the module may comprise battery cells and may be integrated into the module in place of the capacitors.

Excessive cell voltage can damage an individual cell, the module in which the cell is located, or both. Cell balancing circuits ("balancing circuits") can be used to discharge battery or ultracapacitor cells to equalize cell voltages and prevent or minimize damage caused by excessive cell voltage conditions. Such excessive cell voltage can be discharged by one or more of a passive component, for example one or more resistors, and an active component, for example one or more transistors or regulators, in the balancing circuit. There are three types of balancing strategies generally applicable to balancing cells within the module. One option is passive balancing with a resistor (or resistive component) in parallel of each cell without individualized or independent control. Another option is active balancing within a certain voltage range with an ability to control activation/deactivation of the balancing circuit (e.g., the balancer) based on one or more voltage thresholds. Additionally, active balancing may be performed based on a relative capacitance of each cell of the module compared to an average capacitance of all cells in the module to make all cells reach the same voltage at the top of the charge (e.g., the same high voltage). In some embodiments, combinations of these options may be used in a single application. These embodiments, while focused on application to a single module, may not be applicable in high voltage or very high voltage (e.g., greater than ten kilovolts (10 kV)). In some embodiments, active balancing may similarly be performed on cells comprising batteries using similar state of charge or state of health determinations or calculations.

A passive dissipative component may be unable to individually control a flow of current, while an active dissipative component may be capable of controlling current flow. Both active and passive dissipative components may dissipate voltage. In some embodiments, the passive dissipative components may discharge voltage through constant current discharge or through resistive discharge. In the case of a constant current discharge circuit, a constant discharge current is drawn from the cell, independent of the cell voltage or the voltage being discharged. A resistive discharge circuit draws a discharge current that is proportional to the cell voltage. As the voltage of the cell increases, the discharge current also increases and vice versa. Examples of passive dissipative components may include fixed resistors, variable resistors, thermistors, passive attenuators, potentiometers, etc. Examples of active dissipative components may include transistors, regulators, active attenuators, active diodes, etc.

Some of the embodiments of the balancing circuits described herein allow for splitting the actual voltage dissipation between both the active and passive components. This may increase the efficiency of the voltage dissipation, may reduce the number of components needed, and may eliminate the need for some expensive active or passive components, relative to previous cell balancing circuits.

None of these technologies above can balance the module voltage among the module string of the system.

Improved Module and System Balancing Circuit

In some embodiments, the cell balancing circuits described herein are coupled to cells in the module. In balancing multiple modules in a system of modules, each module may include its own cell balancing circuit(s) that is implemented to balancing each module individually but in a coordinated manner with the remaining modules of the system. By utilizing balancing in a system of modules and cells, all of the cells in the system may reach their respective failure points at approximately the same time, instead of older cells in the system aging faster than newer cells in the system, which may occur without use of a balancing system that can balance across the modules of the system.

In some embodiments, balancing the cells of a module may occur or be performed at a predetermined voltage of the system of modules. For example, the cells may be balanced at a particular voltage and then adjusted (e.g., reduced) to a desired voltage based on the known balance information. Accordingly, the balanced system may be adjusted to any voltage such that the individual cells are set to their respective corresponding values while summing to the desired system voltage without need for additional balancing at the desired system voltage. Accordingly, the desired system voltage may be dynamically adjusted without need for additional balancing, etc., based purely on the desired system voltage. In some embodiments, the desired system voltage may be a set point that is established between a maximum system voltage (e.g., a maximum voltage that the system of modules is capable of generating) and zero volts.

FIG. 1 illustrates a hierarchical control and communication structure for components of a system including a series coupled string of capacitor modules arranged in cabinets and controlled by a system controller, in accordance with an embodiment. The system controller 105 may coordinate communication between a plurality of cabinets 115A-115n. In some embodiments, the cabinets 115A-115n may communicate directly with each other or with a subset of other cabinets 115. In some embodiments, the cabinets 115A-115n may only communicate with each other via the system controller 105. The cabinets 115A-115n may include one or more capacitor modules 125A-125n (modules 125). In some embodiments, the modules 125A-125n may communicate directly with each other or with a subset of other modules 125. In some embodiments, the modules 125A-125n may only communicate with each other via the cabinets 115 and the system controller 105. The modules 125A-125n may include one or more capacitor cells 135A-135n (cells 135). In some embodiments, the cells 135A-135n may communicate directly with each other or with a subset of other cells 135. In some embodiments, the cells 135A-135n may only communicate with each other via the modules 125, the cabinets 115, and the system controller 105. Though not shown here, the system 100 may include 20 cabinets 115 each including 10 modules 125, with each module 125 comprising 48 cells 135. In some embodiments, the system of modules 125 and cells 135 may not be arranged as shown. Instead, the system of modules 125 and cells 135 may be arranged in a single cabinet 115 and the system controller 105 may be integrated into one or more of the modules 125 and configured to communicate with all other modules 125 of the system of modules 125 and cells 135.

In the hierarchical system 100 shown in FIG. 1, the system controller 105 may control cell balancing of all the cells 135A-135n in the string of modules 125A-125n at a top voltage (e.g., a maximum desired voltage of the system 100). Such balancing may result in less aged cells 135 (e.g., the cells 135 of the system 100 having a larger capacitance than the average cell 135 of the system 100) operating at higher voltages than aged cells 135 (e.g., the cells 135 of the system 100 having lower capacitance than the average cell 135 of the system 100). To balance the system 100 at the top voltage, the balancing system implemented by the system controller 105 may first determine relative capacitances among the cells 135A-135n in the modules 125A-125n. These relative capacitances may be communicated between the cells 135, modules 125, and/or cabinets 115 as needed to properly balance each cell based on its capacitance relative to an average capacitance of the remaining cells 135 of the system 100. In some embodiments, the balancing of the cell 135 may be based on its capacitance relative to the remaining cells 135 of the same module 125. In some embodiments, the cell 135 may be balanced within a subset of the system 100 that includes more than just the module 125 of the cell 135. Accordingly, communications within the system 100 may occur between the modules 125 or through the cabinets 115 or through the controller 105 (depending on the level of the system 100) to balance cells within single or multiple levels system 100. In some embodiments, each cell 135 or module 125 may be balanced to a target voltage, as established by the system controller 105 or one or more of the modules 125. In some embodiments, the relative capacitance may be communicated to the system controller 105 or among the modules 125.

In some embodiments, the system controller 105 may establish a maximum low voltage cell difference (e.g., difference between the cell having the highest "balanced" voltage and the cell having the lowest "balanced" voltage) as a target offset to balance the system 100 having a large number of cells 135 and modules 125. This may help maintain individual cells 135 within a maximum desired voltage range, which may allow for improved balancing. For example, each module 125 in the system 100 may have a different voltage even though the entire system 100 is at its target voltage. For example, when all but one of the modules 125 is at 120V and one module 125 is at 60V, the average cell voltage across the system 100 may be 2.488V (while the modules 125 at 120V have cells 135 at 2.5V and the module 125 at 60V has cells 135 at 1.25V). Thus, the cells in the modules 125 at 120V may be higher stressed by being forced to operate at the higher voltage (2.5V) than the average voltage (2.488V). However, this voltage difference (0.012V) is too small to turn on the balancing circuits to lower the modules 125 at 120V. By utilizing the target voltage offset, the individual target voltage of each cell 135 may be lowered to a value large enough to turn on the balancing circuit of the modules 125 at 120V. Once the difference (0.012V) is reduce within the balancing threshold, the target value returned is back to normal. Additionally, the system 100 may include a commissioning step that is used to establish the initial relative capacitance for one or more cells or modules of the system 100. The commissioning step may establish the initial relative capacitance and/or may be used to reset the relative capacitance at any time. In some embodiments, the relative capacitance may be reset after maintenance or to update the relative capacitance values after an extended period to identify changes due to cell aging.

In some embodiments, the system 100 (or one or more modules 125) may include an ability to perform reverse voltage balancing, which may allow for the full discharge of the cells 135 when the system 100 is discharged. When the system 100 is discharged, the average discharge voltage of zero volts may maintain one or more cells 135 with positive and/or negative voltages. The reverse voltage balancing process may help minimize these positive or negative charges left in the cells 135 of the modules 125. In the system as described herein, communications between various components (e.g., during commissioning or balancing, etc.) may be time critical to ensure that the cells 135 are balancing based on the most accurate information available. Accordingly, communications may be coordinated and established to ensure fast sample rates and synchronization of voltage measurements among cells 135 and modules 125 in the string of modules and cells of the system 100.

Each of the capacitor modules 125A-125n (e.g., modules 125) may include a plurality of cells 135A-135x. In some embodiments, each of the modules 125 may include the same number of cells 135 or different numbers of cells 135. In some embodiments, the number of cells 135 included in each module 125 may be based on the desired voltage of the module 125, as the cells 135 may be arranged in each module in a series configuration to attain the desired total voltage for the module 125. In some embodiments, the modules 125 may be designed to include the same numbers of cells 135 to reduce system complexity and maintain interoperability of modules within a series of modules. For discussion herein, each module 125 may be assumed to have the same number of cells 135A-135x for a total number of cells 135A-135n distributed between all of the modules 125A-125n.

In some embodiments, the individual cells 135A-135x of the module 125A may communicate various parameters (e.g., voltage, identifier, capacitance, etc.) to the module 125A and may be controlled by the module 125A. For example, the module 125A may control balancing of the individual cells 135A-135x of the module 125A based on a signal from the cabinet 115A. In some embodiments, the module 125A may determine a need to balancing the cells 135A-135x without receipt of the signal from the cabinet 115A and may instead send a request to balance to the cabinet 115A. In some embodiments, the module 125A may constantly balance the cells 135A-135x based on balancing information (e.g., the relative capacitance of the cells 135A-135x or received from the cabinet 115A) on a recurring basis.

Each of the modules 125A-125n may be placed within one of the cabinets 115A-115n. Each cabinet 115 may include a plurality of modules 125A-125x. In some embodiments, each of the cabinets 115 may include the same number of modules 125 or different numbers of modules 125. In some embodiments, the number of modules 125 included in each cabinet 115 may be based on the desired voltage of the cabinet 115 or the system 100, as the modules 125 may be arranged in each cabinet 115 in a series configuration to attain the desired total voltage for the cabinet 115. In some embodiments, the cabinets 115 may be designed to include the same numbers of modules 125 to reduce system complexity and maintain interoperability of cabinets 115 within a series of cabinets 115. For discussion herein, each cabinet 115 may be assumed to have the same number of modules 125A-125x for a total number of modules 125A-125n distributed between all of the cabinets 115A-115n.

In some embodiments, the individual modules 125A-125x of the cabinet 115A may communicate various parameters to the cabinet 115A and may be controlled by the cabinet 115A. For example, the module 125A may provide information regarding one or more of its cells 135A-135x (e.g., capacitance, voltage, identifier, etc.) to the cabinet 115A for communication to the system controller 105 or other modules 125 or cabinets 115. In some embodiments, the module 125A may communicate information regarding maximums and minimums of its cells (e.g., maximum voltage and identifier of cell 135 with highest voltage in module 125, minimum voltage and identifier, maximum capacitance and identifier, minimum capacitance and identifier, etc.).

Each of the cabinets 115A-115n may communicate with the system controller 105. The system controller 105 may communicate with a plurality of cabinets 115A-115x. In some embodiments, the number of cabinets 115 included in the system 100 may be based on the desired voltage of the system 100, as the cabinets 115 may be arranged in a series configuration to attain the desired total voltage for the system 100. For discussion herein, the system 100 may be assumed to have the two cabinets 115A-115x for a total number of modules 125A-125n and for a total number of cells 135A-135n distributed between the system 100.

In some embodiments, the cabinets 115A-115x may communicate various parameters to the system controller 105. For example, the cabinet 115A may provide information regarding one or more of its cells 135A-135x (e.g., capacitance, voltage, identifier, etc.) to the system controller 105 or other modules 125 or cabinets 115. In some embodiments, the cabinet 115A may communicate information regarding maximums and minimums of its cells (e.g., maximum voltage and identifier of cell 135 with highest voltage in cabinet 115, minimum voltage and identifier, maximum capacitance and identifier, minimum capacitance and identifier, etc.).

Figure 2:
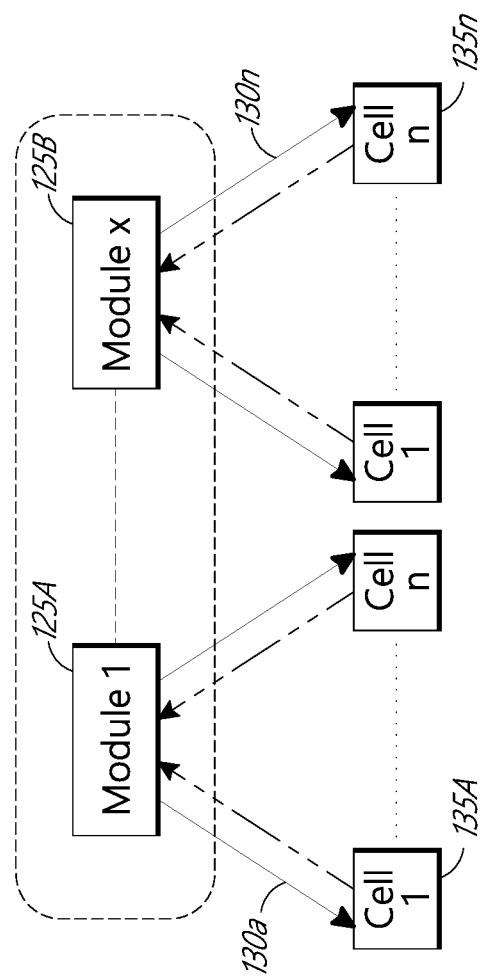
FIG. 2 illustrates an excerpt of the hierarchical control and communication structure of FIG. 1 detailing exemplary communication between different modules and between a module and cells within that module, in accordance with an embodiment.

FIG. 2 illustrates an excerpt of the hierarchical control and communication structure of FIG. 1 detailing exemplary communication between different modules and between a module and cells within that module, in accordance with an embodiment. As shown, module 125A may communicate with the module 125B. For example, the modules 125A and 125B may exchange module voltage values, cell quantities, and high/low voltage offsets, just to name a few. Each of the modules 125A and 125B may communicate with their respective cells 135A-135n. As shown, the communications occurring between the modules 125A and 125B and the cells 135A-135n may provide information used for cell balancing, though other processes and/or information may be communicated.

Figure 3:
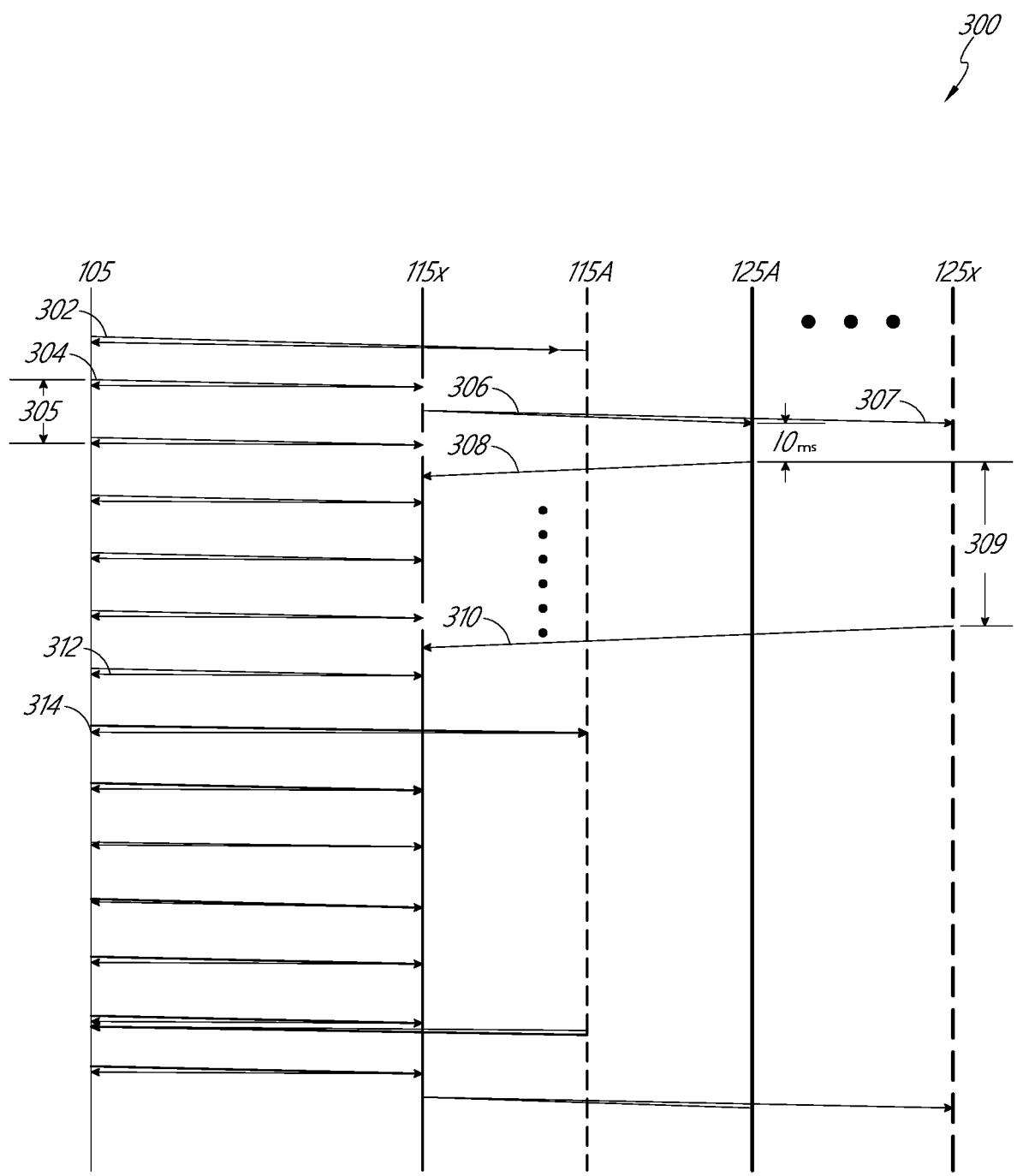
FIG. 3 illustrates a communication-timing diagram detailing synchronization communications between the components of the system of FIG. 1, in accordance with an embodiment.

FIG. 3 illustrates a communication-timing diagram detailing synchronization communications between the components of the system of FIG. 1, in accordance with an embodiment. As shown, the communication timing diagram 300 depicts the system controller 105 of FIG. 1 in the left-most position and as the location where communication cycles initiate and terminate. Time is along the vertical axis. The communication cycle may include an amount of time from when the system controller 105 submits a request for various information from each cell 135, module 125, or cabinet 115 to when the system controller 105 receives the final response from the last module 125 via the cabinet 115. In some embodiments, communications between the system controller 105 and the cabinet 115 may be over a different protocol than the communications between the cabinet 115 and the modules 125. For example, the system controller 105 may submit its request to the cabinet 115 via Profibus or some similar token based communication protocol. The communications from the cabinet 115 to the modules 125 may be over Ethernet, controller area network, or a similar multicast communication protocol. Thus, the communications between the system controller 105 and the modules 125 bridge at least two communications protocols without introducing any or with minimal delays or increasing cycle times.

The system controller 105 may utilize the communication cycles to synchronize various parameters between the multiple modules 125 of the system 100. For example, the communication cycles may synchronize cell or module voltages. Accordingly, cycle zero is initiated with a message 302 from the system controller 105 including a voltage synchronization request. This voltage synchronization request from the system controller 105 may be communicated to the cabinet 115A (e.g., cabinet 1 of the system 100). Once the message is received at the cabinet 115A, the system controller 105 may submit the synchronization request to the cabinet 115x (e.g., cabinet 20 of the system 100) via the message 304, where the cabinet 115x is the last cabinet 115 in the system 100. Approximately 7.6 milliseconds (ms) may pass between when the messages 302 and 304 are sent, with there being approximately 8 ms between messages 305 from the system controller 105 to each of the cabinets 115, on average. Since this initial communication between the system controller 105 and the cabinets 115 may occur over a token-based communication protocol, each of the communications to the cabinets 115 may occur one at a time in a particular sequence with minimal communications delays between the cabinets 115 and the system controller

105. Additionally, the communications from the cabinets 115 to the system controller 105 may be scheduled based on the communications from the system controller 105 to each cabinet 115. Though only cabinets 115A and 115x are shown, it will be understood that this represents cabinets 115A-115x.

Once the cabinets 115A-115x receive their respective synchronization requests from the system controller 105 over the first communication protocol, the cabinets 115A-115x may each broadcast the synchronization message to their respective modules 125, e.g., via message 306. In some embodiments, each of the cabinets 115A-115x may send out their respective synchronization messages at the same time (or in a coordinated manner). Since the communications between the cabinets 115 and their modules 125 may occur over a multicast network, the synchronization messages may be broadcast via the messages 306 to all modules 125 of the cabinet 115 at once and responses from the modules 125 to the cabinets 115 may occur in a random order where collisions between competing modules 125 may occur, e.g., via messages 308 (from the first module 125A of the cabinet 115x) and 310 (from the last module 125x of the cabinet 115x).

As shown, there may be approximately a 10 millisecond (ms) delay 307 for the module 125A to sample all voltages of the cells 135A-135x within the module 125A. This delay 307 may account for time to sample the necessary information from each cell. In some embodiments, this delay 307 may also account for time needed to identify particular values (e.g., maximum and minimum cells and voltages, etc.). There may be an approximate delay 309 that includes the 10 ms sampling time as well as a delay caused by the collisions or time to wait for the protocol to be clear and available from other messages from other modules 125. Thus, the delay 309 may be closer to 30 ms (10 ms sampling time+approximately 20 ms communication delay).

Due to the nature of cyclic communication established between the system controller 105 and the cabinet 115, the communications may continue between the system controller 105 and the cabinet 115, even while the cabinet 115 is waiting for data from its modules 125. During this time (e.g., while the cabinet 115 is awaiting data), the system controller 105 may continue to repeat the same voltage synchronization request. Along with other parameters related to voltage synchronization, the data exchanged between the system controller 105 and the cabinets 115 may also consist of a counter value set at a unique value X which indicates that the system controller 105 has issued a synchronization request to the cabinet 115. The cabinet 115 counter value is updated to the same value X when it accepts the request and starts sampling its module 125. This counter value is an indication to the system controller 105 (included in all communications back to the system controller 105 from the cabinet 115) that the requested data is not ready and that the corresponding data received from the cabinet 115 is old data and not ready for processing by the system controller 105.

Once the cabinet 115 has sampled all the data from respective modules 125, the cabinet 115 updates the counter value to a different unique value Y, which indicates that the average module voltage is available, for communication back to the system controller 105. This counter value is an indication to the system controller 105 that the data received from the cabinet 115 is current and/or updated data (e.g., the average module voltage), and is ready for processing by the system controller 105.

Once the system controller 105 has received data from all cabinets 115, it evaluates the overall average module voltage and other necessary parameters and updates the counter value to a different unique value Z which indicates to the cabinets 115 that average module voltage in the communications from the system controller 105 is updated. In some embodiments, the overall overage average module voltage may be an average of all of the module voltages received from all the cabinets 115. In some embodiments, the overall module voltage may be one of the highest or lowest average module voltage as received from the cabinets 115. For example, the overall average module voltage may be the overall lowest or minimum average module voltage or the overall largest or maximum average module voltage. The cabinet 115 counter value is updated to the same value Z when it accepts the subsequent request and stores the new value. The same counter value Z is continued to be exchanged between the system controller 105 and cabinet 115 until the next cycle of synchronization begins and the system controller 105 sends the next synchronization request with the counter value X.

In some embodiments, since the synchronization messages are broadcast to all modules 125 from the cabinet 115 at the same time, each module 125 may receive the synchronization message at a different time dependent on an amount of time that it takes for a message to propagate from the cabinet 115 to the module 125. In some embodiments, a distance between the module 125 and a cabinet controller may determine the amount of time it takes for the message to propagate. Thus, the message 308 may be received from a first module 125A of the cabinet 115x while the message 310 may be received from a last module 125x of the cabinet 115x. In some embodiments, the messages received from the modules 125 of the cabinet 115x may include one or more parameters related to the communicated synchronization message. Where the synchronization message communicated by the system controller 105 corresponds to cell or module voltage balancing and/or voltage polling, the modules 125 of the cabinet 115x may communicate their average module voltages (e.g., based on their respective cell voltages). In some embodiments, the modules 125 of the cabinet 115x may communicate information about their maximum cell voltage and minimum cell voltage or corresponding cell voltages that may be of interest to the system controller 105 or the cabinet 115x.

Once the cabinets 115A-115x receive the information from their respective modules 135A-135x, the cabinets 115A-115x may communicate the received information (or a subset of that information) to the system controller 105. In some embodiments, the subset of information communicated from the cabinets 115 to the system controller 105 may comprise the maximum and minimum values of cells 135 and/or modules 125 for the respective cabinet 115. Once the system controller 105 receives the information from the cabinets 115A-115x, the system controller 105 may determine an average module voltage of all the modules 125 of the system 100 and include the average module voltage to the cabinets 115A-115x for distribution to their respective modules 125A-125x. The average module voltage may be used to calculate the target cell voltage for each cell 135 in the module 125 and to allow the modules 125 to compare the actual voltage of each cell 135 with the target voltage to decide if the balancing circuit should be on or active. In some embodiments, the average module voltage is updated every 100 ms (e.g., once per cycle). As shown, the steps described above repeat with cycle 1, which begins at approximately 100 ms.

Figure 4:
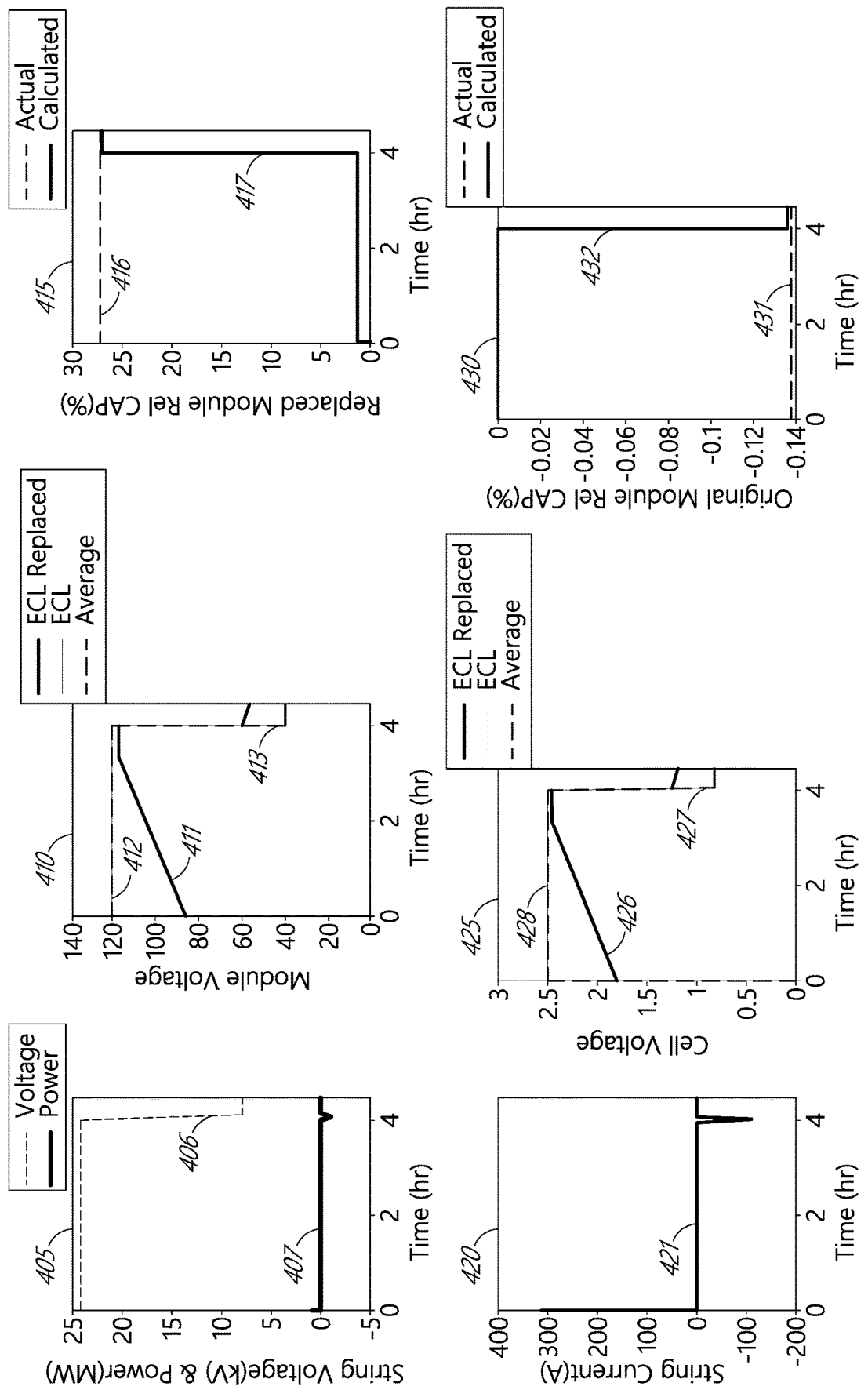
FIG. 4 illustrates graphs showing various stages of a commissioning process of the system of FIG. 1, in accordance with an embodiment.

FIG. 4 illustrates graphs showing various stages of a commissioning process of the system of FIG. 1, in accordance with an embodiment. The graphs 405-430 correspond to the commissioning process of the system 100 during which the modules 125 and cells 135 of the system 100 are charged from 0V to a maximum voltage. As shown, the maximum voltage is approximately 25 kV, though this voltage may comprise any voltage less than 25 kV or greater than 25 kV. During the commissioning process, the modules 125 and the cells 135 of the system 100 may be held at their voltages to maintain the maximum voltage until all cells of the system 100 are balanced. When the system 100, operating at a voltage lower than the maximum voltage, is balanced, the cell voltage will be vary based upon the relative capacitance value of each cell 135. The difference of the voltage of each cell 135 may depend on a difference of relative capacitance values.

Once all the cells are balanced while maintaining the maximum voltage of 25 kilovolts (kV), the cells 135 of the system 100 are discharged by more than approximately 0.5V. As shown, the cells 135 of the system 100 are discharged to approximately 0.8V (or discharged by 1.7V). While the described voltage drop is 1.7V, the voltage drop may be any value by which the relative capacitance of the cells 135 may be determined (e.g., the minimum voltage drop may be 0.52V based on the capacitors being used). Additionally, the system 100 as shown may have a maximum string voltage of 25 kV before balancing of the cells 135, a maximum module voltage difference (e.g., maximum permissible difference in module voltages) of 33V, and a maximum cell voltage difference (e.g., maximum permissible difference in cell voltages) of 0.7V.

The graph 405 shows a string voltage in kV and power in megawatts (MW) along the y-axis as a function of time in hours (hr) along the x-axis. A line 406 shows the string voltage over time while a line 407 shows the string power over time. The line 406 shows that the string voltage rises from 0V to approximately 25 kV at time 0 while there is a brief spike in the power shown by the line 407. The string then maintains its voltage at 25 kV (plateau in the line 406). At time 4 hr, there is a brief drop in string power (dip in the line 407) while the string voltage drops to approximately 8 kV (drop in line 406). The string voltage and the string power are both constant after the 4 hr time.

The graph 410 shows a module voltage in V along the y-axis as a function of time in hr along the x-axis. A line 411 shows a voltage of a module at the beginning of its life (e.g., a recently replaced module or new module). A line 412 shows a voltage of the string voltage over time while a line 407 shows the string power over time. A line 413 shows an average voltage of all the modules 125 of the system 100. In the graph 410, the line 411 shows that between time 0 and approximately time 3 hr, the voltage in the new module increases from approximately 90V to approximately 120V. Over the same period, the lines 412 and 413 show module voltages for modules that were already part of the string or that are near the ends of their lives are at 120V from time 0 to approximately time 4 hr, at which point all three lines 411-413 drop. The line 411 drops to approximately 60V and begins a gradual drop beyond time 4 hr while the lines 412 and 413 drop directly to 40V where they plateau.

The graph 415 shows a replaced module relative capacitance percentage (%) along the y-axis as a function of time in hours (hr) along the x-axis. A line 416 of the graph 415 shows an actual relative capacitance of the new module described in relation to the graph 410 as it changes over time. A line 417 shows a calculated relative capacitance of the new module over the same period of time. In the graph 415, the line 416 shows that the new module has an actual relative capacitance of approximately 27% at all times on the graph 415. The line 417 shows that while the actual relative capacitance of the new modules is approximately 27%, the calculated relative capacitance is zero because the module is new and has not been previously commissioned. However, once the string voltage is dropped to 8 kV at 4 hr, the system 100 is able to calculate the relative capacitance of the new module as being its actual relative capacitance of approximately 27%, which is shown on the graph 415 at greater than 4 hr.

The graph 420 shows a string current in amps (A) along the y-axis as a function of time in hr along the x-axis. A line 421 of the graph 420 shows the string current as it changes over time. In the graph 420, the line 421 shows that the string current spikes to approximately 300 A at time 0 hr and then maintains at 0 from time 0 hr to time 4 hr before dropping to −100 A at approximately time 4 hr.

The graph 425 shows a cell voltage in V along the y-axis as a function of time in hr along the x-axis. A line 426 of the graph 425 shows a cell voltage of one of the cells of the new module as it changes over time. A line 427 shows a cell voltage of one of the cells of one of the existing modules or modules at the ends of their lives as it changes over time. A line 428 shows an average cell voltage of the cells of the system 100 as it changes over time. In the graph 425, the line 426 shows that the cell voltage of one of the cells of the new module begins at approximately 1.8V before rising steadily to approximately 2.5V at about 3.4 hr. At 3.4 hr, the line 426 (and the cell voltage) plateaus briefly before dropping to 1.3V at 4 hr, from where the cell voltage of the new module steadily drops at time greater than 4 hr. Over the same period of time, the line 427 shows that the cell voltage of the cells of the old modules are immediately charged from 0V to approximately 2.5V at time 0 hr and maintain their 2.5V charge until time 4 hr, at which time they drop to approximately 0.8V, where they are maintained. The line 428 shows that the average cell voltage generally mimics the line 427 over the same time period.

The graph 430 shows an original module relative capacitance percentage (%) along the y-axis as a function of time in hours (hr) along the x-axis. A line 431 of the graph 430 shows an actual relative capacitance of the original module described in relation to the graph 410 as it changes over time. A line 432 shows a calculated relative capacitance of the original module over the same period of time. In the graph 430, the line 431 shows that the original module has an actual relative capacitance of approximately −0.14% % at all times on the graph 430. The line 432 shows that while the actual relative capacitance of the original module is approximately −0.14%, the calculated relative capacitance is zero. However, once the string voltage is dropped to 8 kV at 4 hr, the system 100 is able to calculate the relative capacitance of the original module as being its actual relative capacitance of approximately −0.14%, which is shown on the graph 430 at greater than 4 hr.

When viewed in combination with each other, the graphs 405-430 show that when the system 100 is charged (e.g., string voltage increases from 0 kV to approximately 25 kV), the current of line 421 increases from zero to approximately 300 A. While the string voltage is maintained at 25 kV, the current is maintained at zero. Then, when the string voltage of the system 100 is discharged to approximately 8 kV, the string current of the system 100 drops to approximately −100 A before stabilizing at zero again when the string voltage is maintained at 8 kV. Similarly, when the system 100 is charged to its maximum voltage of approximately 25 kV, each module is charged to 120V (shown by line 412)

while new modules are also charged to the same voltage (shown by line 411). Similarly, when the system 100 is charged to its maximum voltage of approximately 25 kV, each cell is charged to approximately 2.5V (shown by line 428) while new cells are also charged to the same voltage (shown by line 426). By charging and discharging the new module, the system 100 is able to determine the relative capacitance of the new module, as shown by line 417. By charging and discharging the original modules, the system 100 is able to determine the relative capacitance of the original modules, as shown by line 432. Thus, through the steps of the commissioning process, the system 100 is able to determine the relative capacitances of new and original modules.

Figure 5:
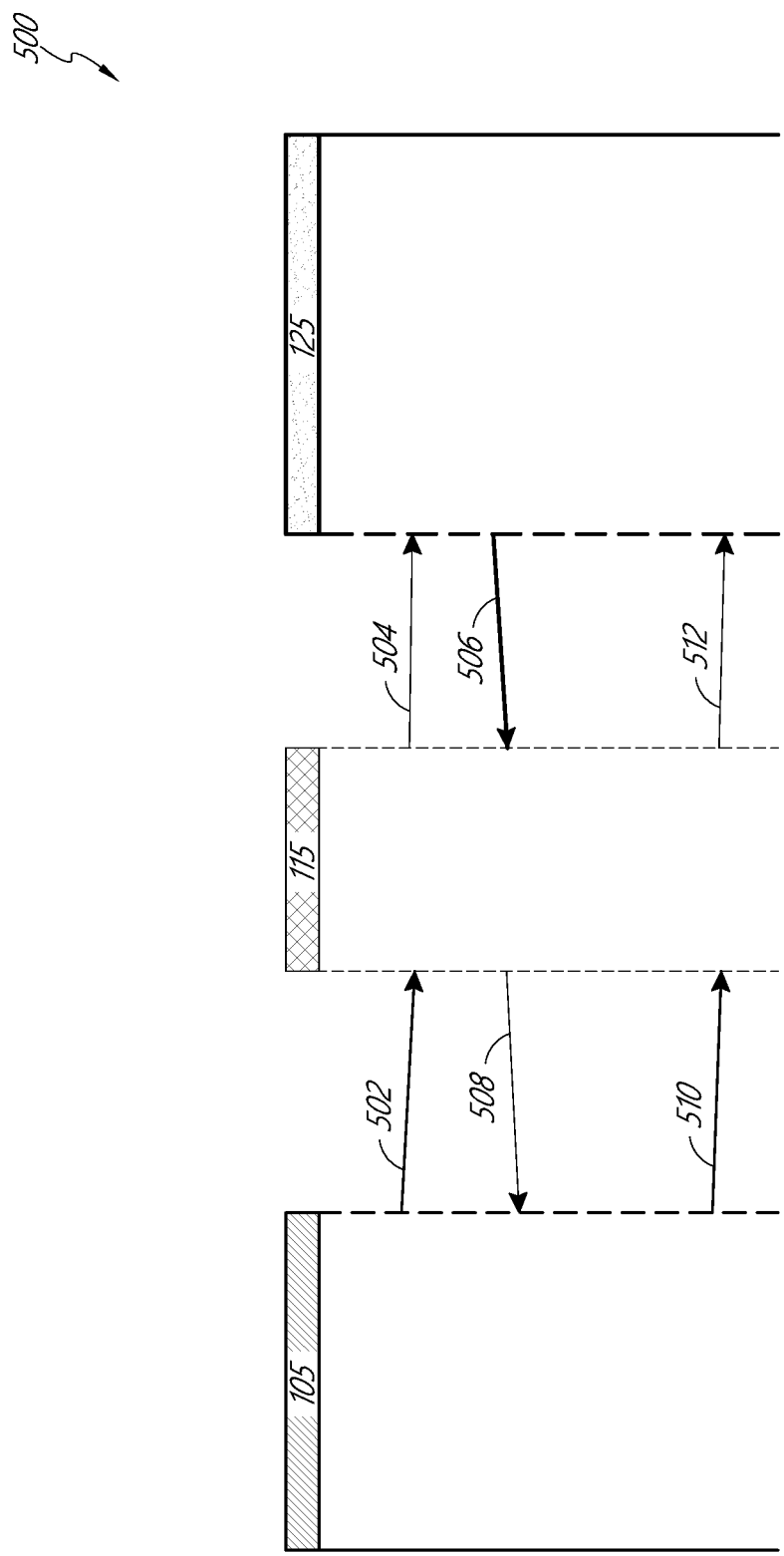
FIG. 5 illustrates a communication flow diagram between the system controller of the system of FIG. 1 and the cabinets and modules of the system during the commissioning process described in FIG. 4, in accordance with an embodiment.

FIG. 5 illustrates a communication flow diagram between the system controller of the system of FIG. 1 and the cabinets and modules of the system during the commissioning process described in FIG. 4, in accordance with an embodiment. The communication flow diagram includes communications from the system controller 105 to the cabinets 115 and from the cabinets 115 to the modules 125. Though only a single cabinet 115 is shown, it will be understood that all communications between the system controller 105 and the cabinet 115 occur between the system controller 105 and all the cabinets 115 of the system 100. Similarly, although only a single cabinet 115 and module 125 are shown, it will be understood that all communications between the cabinet 115 and the module 125 occur between all the cabinets 115 and all of their respective modules 125.

The commissioning process begins with the system controller 105 receiving a command (not shown) to commission the system 100. In some embodiments, the system controller 105 may instead determine that the commissioning process needs to be performed (e.g., based on an elapsed time since last commissioning, detection of a replaced cabinet 115, module 125, or cell 135, etc.). Accordingly, the system controller 105 may determine to charge the system 100 to its maximum voltage and hold the system at that voltage. The system controller 105 may then send a communication 502 to the cabinet 115 to reset the relative capacitance. In some embodiments, this communication 502 may include a bit indicating the relative capacitance reset (e.g., reset_relcap="1"). The cabinet 115 may receive the communication (e.g., the relative capacitance reset bit) and pass that communication to the module 125 via a communication 504, for example, via a bit indicating the relative capacitance reset. In some embodiments, for example when the control functions of the system controller 105 are distributed among the modules 125, one or more of the modules 125 may instruct all modules of the string to reset the relative capacitance based on transmitting a reset_relcap="1" to all modules 125 in the string.

In some embodiments, the system controller 105 may cause each of the plurality of modules 125 to determine a relative capacitance for each of its respective cells 135 based on the overall average cell voltage. For example, based on receiving the relative capacitance reset bit and the various information regarding the average cell voltages for the other modules 125 or the entire string received from the system controller 105, the module 125 may determine a relative capacitance for each of its respective cells. In some embodiments, the system controller 105 may explicitly instruct each module 125 to determine the relative capacitance for each of its respective cells or may instruct specific modules 125 to determine the relative capacitance for each of its respective cells.

Upon receiving the instruction to reset the relative capacitance, the module 125 may balance its cells 135 and then turn off its cell balancing circuit(s). Balancing of the cells of the system 100 may be performed according to the equations below. Modules or cells may be balanced by first determining the relative capacitance of an individual cell or module using Equation 1 below:

$$C_{i\_rel} = 1 - \frac{n/\sum_{i=1}^{n}(1/Ci)}{Ci} = 1 - \frac{dVi}{dVavg} \qquad \text{Equation 1}$$

Where:
$C_{i\_rel}$: individual unit (cell or module) relative capacitance value
Ci: individual unit (cell or module) capacitance
n: total number of cells in each module or modules in each string
dVi: voltage change per cell or module during charge or discharge
dVavg: average voltage change among cells in the module or modules in the string during charge or discharge In some embodiments, the system controller 105 may cause each of the plurality of modules 125 to cause each of the plurality of modules to balance the cells of the module based on the respective relative capacitances for each of the cells of the module. For example, based on receiving the relative capacitance reset bit and the various information regarding the average cell voltages for the other modules 125 or the entire string received from the system controller 105, the module 125 may determine to balance its cells based on the calculated relative capacitances for each of the cells of the module. In some embodiments, the system controller 105 may explicitly instruct each module 125 to balance or may instruct specific modules 125 to balance.

Once the relative capacitance is known, the target balancing voltage for the module or cell may be determined based on Equation 2 below:

$$V_{i\_target} = \min(V\max, V\mathrm{avg} + C_{i\_rel} * (V\max - V\mathrm{avg})) \qquad \text{Equation 2}$$

Where:
Vavg=Vstring/Number of cells in the string
$C_{i\_rel}$: individual unit (cell or module) relative capacitance value
$V_{i\_target}$: individual unit (cell or module) target balancing voltage
Vavg: average cell voltage in the string
Vmax: maximum cell charge voltage change The balancing circuit(s) may be controlled such that every 1 second, the sampled voltage is compared to the previous voltage to determine if the relative capacitance value can be updated. The balancing circuit(s) may be controlled such that every 100 ms, each cell voltage is sampled in sequence and compared to the target voltage as calculated above in Equation 2. If Vi>Vi_target−dVi, turn on balancer; if Vi<=Vi_target, turn off balancer, where dVi=max(0,Vi_target−Vi). In some embodiments, these comparisons may be adjusted based on one or more offsets or thresholds based on the accuracy of the calculations.

Within 100 ms, every 200 µs, the power of each cell is computed and cumulated until it reaches a threshold power value. If the threshold power value is reached in 100 ms, the cell balancing circuit is turned off. Within 100 ms, every 200 µs, the power of whole module is computed and cumulated until it reaches a module threshold power value. If the module threshold power value limit is reached in 100 ms, the cell balancing circuit is turned off.

Accordingly, the modules balance their cells at the top voltage (e.g., the maximum voltage of the cell) and shuts off the balancing circuits once the cells 135 are all balanced.

Once all of the cell balancing circuits are off (e.g., the cells 135 of the module 125 are all balanced), then the module 125 indicates to the cabinet 115 that the module 125 is done balancing its cells at the maximum voltage via a communication 506 including a bit (e.g., cell_balanced="1"). The cabinet 115 then, upon receiving such indications (e.g., bits) from each of its modules 125, will then send a signal to the system controller 105 indicating that all the cells 135 of all of its modules 125 are balanced (e.g., via a communication 508). This may be communicated in communication 508 via another bit (e.g., a sum_cell_balanced bit). Once all cells 135 in the system 100 are balanced, the system controller 105 samples the minimum cell voltage of the cells 135 as a starting voltage (Vc0). The system 100 then discharges the system 100 until the maximum cell voltage (Vc1)−Vc0>0.52V (an example delta voltage for the relative capacitance calculation). The system controller 105 then stops the discharge and waits for at least one second for the module 125 to reset the relative capacitance values. In some embodiments, system controller 105 may wait to receive an indicator from each module 125 indicating that the relative capacitance values are reset. The module 125 resets the initial relative capacitance values and the system controller 105 sets the Reset Relative capacitance indicator to zero and sends it to all cabinets 115 and modules 125 via communications 510 and 512 (e.g., reset_relcap bit is now "0").

Thus, in the commissioning process, the system 100 starts with a voltage of 0V. The system 100 is then charged to a maximum voltage of approximately 25 kV (or a cell voltage of approximately 2.5V), consuming a charge power of 5.5 MW. The system 105 is then controlled to de-rate the system 105 to a maximum cell voltage of 2.5V regardless of the maximum voltage of the cell 135. The maximum voltage is held for 4 hours to have all cells voltage balancing at the top voltage of 2.5V (or the top desired voltage of the cell 135). The system then enables commissioning (e.g., sets commissioning flag or bit="1") to preset an initial relative capacitance at the first discharge. The system 100 is then discharged to 17 kV and the 5.5 MW power is discharged (or any pre-defined current or power is discharged).

Figure 6:
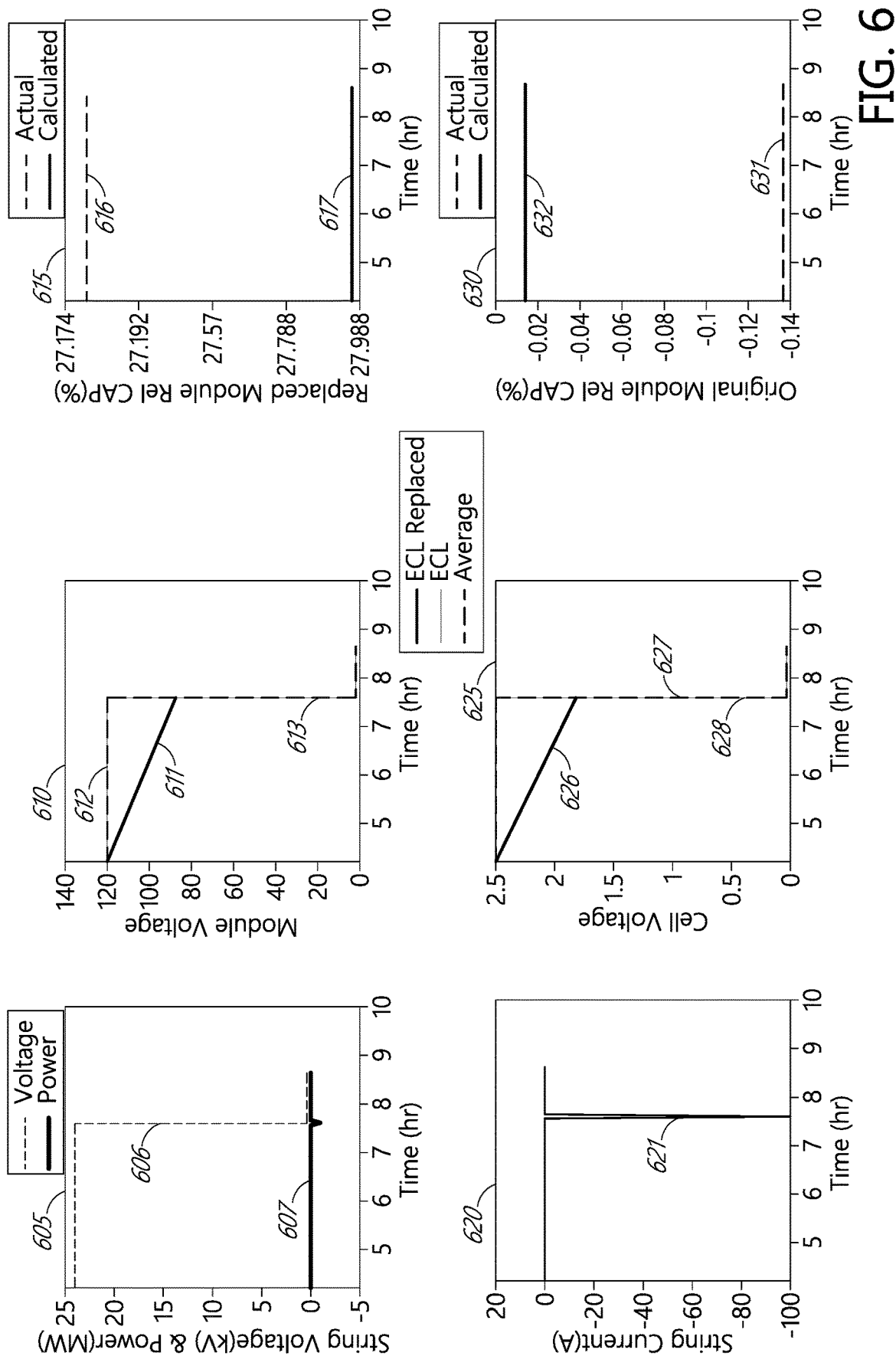
FIG. 6 illustrates graphs showing various stages of a discharge process of the system of FIG. 1, in accordance with an embodiment.

FIG. 6 illustrates graphs showing various stages of a discharge process of the system of FIG. 1, in accordance with an embodiment. The graphs 605-630 correspond to the discharge process of the system 100 during which the modules 125 and cells 135 of the system 100 are discharged to 0V (e.g., from a maximum voltage). As shown, the maximum voltage is approximately 25 kV, though this voltage may comprise any voltage less than 25 kV or greater than 25 kV. The system is held at the maximum voltage until all cells are balanced to their target voltage. The system is then discharged to 8 kV for relative capacitance learning (or any other pre-defined voltage). The system is then charged to its maximum voltage and held there for 4 hours with inverted balancing requested. The system is then discharged to 0V (or any voltage pre-defined) and the accumulated power is discharged at a maximum current. In some embodiments, the system 100 may be discharged from any voltage for the system 100.

The graph 605 shows a string voltage in kV and power in megawatts (MW) along the y-axis as a function of time in hours (hr) along the x-axis. A line 606 shows the string voltage over time while a line 607 shows the string power over time. The line 606 shows that the string voltage is at approximately 25 kV at time 4 hr and drops at approximately time 7.5 hr to 0 V while there is a brief negative spike in the power shown by the line 607. The string then maintains its voltage and power at 0V and 0 W respectively (plateau in the lines 606 and 607).

The graph 610 shows a module voltage in V along the y-axis as a function of in hr time along the x-axis. A line 611 shows a voltage of the new module. A line 612 shows a voltage of the original modules over time. A line 613 shows an average voltage of all the modules 125 of the system 100 over time. In the graph 610, the line 611 shows that between time 4 hr and approximately time 7.5 hr, the voltage in the new module decreases from approximately 120V to approximately 90V. Over the same period, the lines 612 and 613 show module voltages for modules that were already part of the string or that are near the ends of their lives are at 120V from time 4 hr to approximately time 7.5 hr, at which point all three lines 611-613 drop to approximately 0V.

The graph 615 shows a replaced module relative capacitance percentage (%) along the y-axis as a function of time in hours (hr) along the x-axis. A line 616 of the graph 615 shows an actual relative capacitance of the new module as it changes over time. A line 617 shows a calculated relative capacitance of the new module over the same period of time. In the graph 615, the line 616 shows that the new module has an actual relative capacitance of approximately 27.173% at all times on the graph 615. The line 617 shows that while the actual relative capacitance of the new modules is approximately 27%, the calculated relative capacitance is approximately 27.166%

The graph 620 shows a string current in amps (A) along the y-axis as a function of time in hr along the x-axis. A line 621 of the graph 620 shows the string current as it changes over time. In the graph 620, the line 621 shows that the string current spikes to approximately −100 A at time 7.5 hr and then maintains at 0 from beyond time 7.5 hr.

The graph 625 shows a cell voltage in V along the y-axis as a function of time in hr along the x-axis. A line 626 of the graph 625 shows a cell voltage of one of the cells of the new module as it changes over time. A line 627 shows a cell voltage of one of the cells of one of the existing modules or modules at the ends of their lives as it changes over time. A line 628 shows an average cell voltage of the cells of the system 100 as it changes over time. In the graph 625, the line 626 shows that the cell voltage of one of the cells of the new module begins at approximately 2.5V before decreasing steadily to approximately 1.8V at about 7.5 hr. At 7.5 hr, the lines 626-628 drop to 0V. Over the period of time from 4 hr to 7.5 hr, the lines 627 and 628 shows that the cell voltage of the cells of the old modules are maintained at 2.5V before dropped to 0V at 7.5 hr.

The graph 630 shows an original module relative capacitance percentage (%) along the y-axis as a function of time in hours (hr) along the x-axis. A line 631 of the graph 630 shows an actual relative capacitance of the original module described in relation to the graph 610 as it changes over time. A line 632 shows a calculated relative capacitance of the original module over the same period of time. In the graph 630, the line 631 shows that the original module has an actual relative capacitance of approximately −0.14% % at all times on the graph 630. The line 632 shows that while the actual relative capacitance of the original module is approximately −0.14%, the calculated relative capacitance is −0.02.

When viewed in combination with each other, the graphs 605-630 show that when the system 100 is discharged to 0V, the current of line 621 drops from zero to −100 A. The module and cell voltages drop at similar times.

Figure 7:
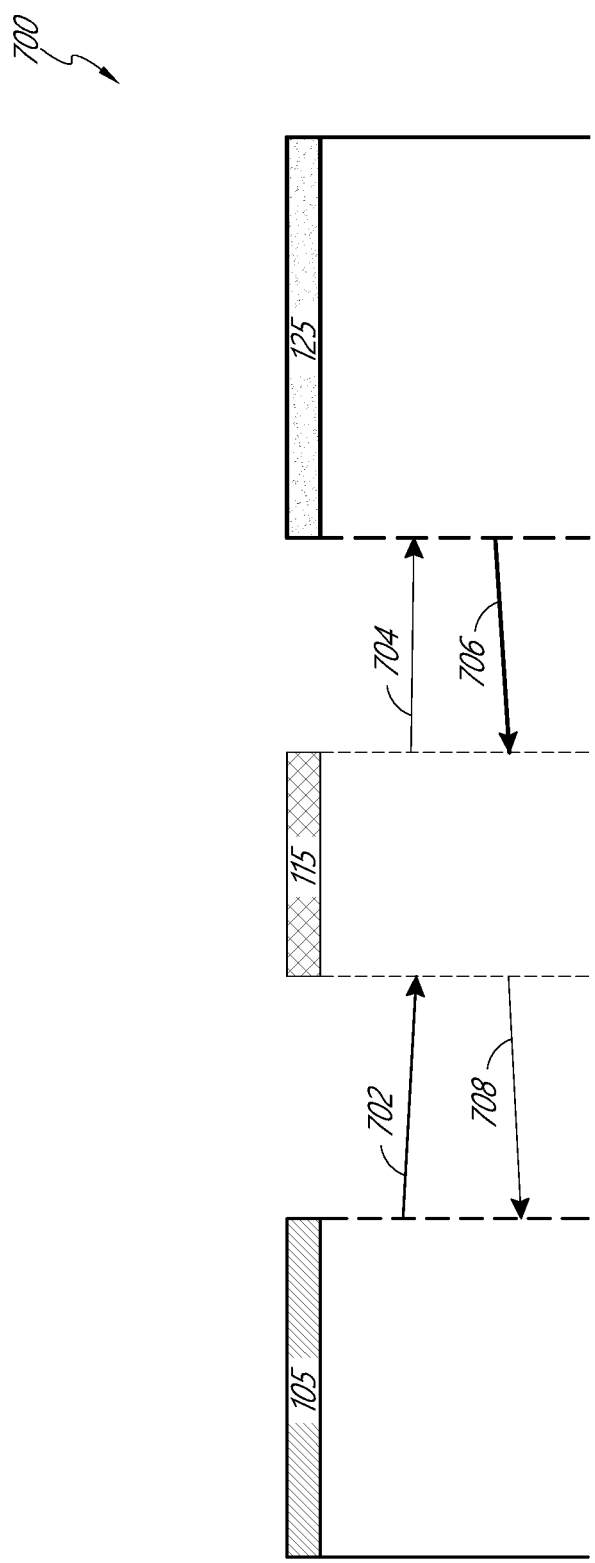
FIG. 7 illustrates a communication flow diagram between the system controller of the system of FIG. 1 and the cabinets and modules of the system during the discharge process described in FIG. 6, in accordance with an embodiment.

FIG. 7 illustrates a communication flow diagram between the system controller of the system of FIG. 1 and the cabinets and modules of the system during the discharge process described in FIG. 6, in accordance with an embodiment. The communication flow diagram 700 includes communications from the system controller 105 to the cabinets 115 and from the cabinets 115 to the modules 125. Though only a single cabinet 115 is shown, it will be understood that all communications between the system controller 105 and the cabinet 115 occur between the system controller 105 and all the cabinets 115 of the system 100. Similarly, although only a single cabinet 115 and module 125 are shown, it will be understood that all communications between the cabinet 115 and the module 125 occur between all the cabinets 115 and all of their respective modules 125.

The discharge process begins with the system controller 105 receiving a command to discharge the system 100. In some embodiments, the system controller 105 may instead determine that the discharge process needs to be performed (e.g., based on an elapsed time since last discharge, detection of a need to replace a cabinet 115, module 125, or cell 135, etc.). Accordingly, the system controller 105 may determine to stop charging of the system 100. The system controller 105 may then send a communication 702 to the cabinet 115 to enter a maintenance mode or state. In some embodiments, this communication 702 may include a bit indicating the maintenance mode command (e.g., maintenance_flag="1"). The cabinet 115 may receive the communication (e.g., the maintenance flag bit) and pass that communication to the module 125 via a communication 704, for example, via a bit indicating the maintenance mode command.

Upon receiving the instruction to enter maintenance mode, the module 125 may calculate a reverse target voltage and balance all cells according to the reverse target voltage and then turn off its cell balancing circuit(s). Balancing of the cells of the system 100 may be performed according to the equations below. Modules or cells may be balanced according to the new reverse target voltage using Equation 3 below:

$$V_{i\_target} = \max(0, \min(V\max, (1-Ci_{rel})*(Vavg))). \quad \text{Equation 3}$$

Where:
Vavg=Vstring/Number of cells in the string
Ci_rel: individual unit (cell or module) relative capacitance value
Vi_target: individual unit (cell or module) target balancing voltage
Vavg: average cell voltage in the string
Vmax: maximum cell charge voltage change The balancing circuit(s) may be controlled similar to the description above with regard to the commissioning process with a target cell voltage of zero V as opposed to the maximum cell voltage. In order to properly discharge, the system controller 105 may stop charge of the system 100 and send fully discharge indicators or commands to the modules 125 (e.g., via messages through the cabinets 115). The modules 125 may then calculate the target voltage based on the relative capacitance and to balance all cells voltage at zero. Once the cells are balanced, the module 125 sends an indicator that the module cells 135 are balanced (e.g., via a balance flag bit) to the system controller 105 through the cabinet 115. Once all module cells 135 are balanced, system controller 105 discharges the system 100 to zero (or some other predetermined value).

Once all of the cell balancing circuits are off (e.g., the cells 135 of the module 125 are all balanced), then the module 125 indicates to the cabinet 115 that the module 125 is done balancing its cells at the maximum voltage via a communication 706 including a bit (e.g., cell_balanced="1"). The cabinet 115 then, upon receiving such indications (e.g., bits) from each of its modules 125, will then send a signal to the system controller 105 indicating that all the cells 135 of all of its modules 125 are balanced (e.g., via a communication 708). This may be communicated in communication 508 via another bit (e.g., a sum_cell_balanced bit).

Once the system controller 105 receives an indication that all the cells 135 of all the modules 125 of all the cabinets 115 are balanced, then the system controller 105 may instruct the system 100 to discharge.

The balancing circuit(s) described herein may discharge voltage when coupled to a cell or module. The balancing circuit can include one or more shared-dissipation balancing circuits. An alternative balancing circuit may include an active component having two terminals for voltage inputs and an output terminal. The active component of this alternative balancing circuit can monitor the voltage of the coupled cell or module via the voltage input terminals and output a signal at its output terminal if the voltage of the coupled cell rises above a predetermined threshold voltage. The other alternative balancing circuit can additionally include resistors and a transistor. The output signal from the active component can be provided, via a first of the resistors, to the transistor. The transistor can act as a switch controlled by the signal output, where the signal output activates or turns on the transistor. When the transistor activates, it creates a path from the coupled cell through a second resistor and the transistor, thereby providing a resistive discharge (variable current) that may dissipate the excess voltage of the coupled cell. This other alternative balancing circuit may mainly dissipate the excess cell voltage through the second resistor. The first resistor and transistor may not contribute significantly to discharging the excess cell voltage.

A second alternative balancing circuit can also be coupled to the cell or module and may include an active component and a passive component. The active component can be a three-terminal device. One of the terminals can be a reference terminal by which the active component may monitor the voltage of the coupled cell or module. If the voltage of the coupled cell or module rises above a threshold voltage, the active component can allow a discharging current to flow from the coupled cell through the active component and the passive component, thus causing the excess cell voltage to dissipate across both the active and passive components. In some embodiments, a shunt regulator, for example a Texas Instruments® TL431 shunt regulator, can be used to implement the active component.

A third balancing circuit may be similar in structure to the second, shared-dissipation balancing circuit. The third balancing circuit may be a linear embodiment of the second balancing circuit. Accordingly, the reference terminal of the active component of the third balancing circuit may couple to a node between the active component and the passive component. Thus, the active component can be configured to monitor the voltage at this node.

In some embodiments, one or more modules 125 may be arranged in a small (e.g., between 2 and 50 modules) string of modules 125. In such embodiments, the string may not include a system controller and may instead distribute controls among the modules 125. Accordingly, all controls and computations involved with balancing cells of the modules 125 may be performed individually by each module 125. Thus, any functionally attributed to the system control 105 herein may instead be performed by one or more (or each) of the modules 125 in the small string. For example, the modules 125 may communicate the various parameters regarding their respective cells 135 to each of the other modules 125 of the string as opposed to a centralized system control 105.

In such distributed embodiments, each module 125 may receive the average cell voltages for each other module 125 of the string and may determine the overall average cell voltage for the string. This overall average cell voltage may be used, by each module 125, to determine a relative capacitance for each of the individual cells 135 of each respective module 125. In some embodiments, each module 125 may determine a relative capacitance for the module 125 itself and/or for the entire string of modules 125. In some embodiments, each module 125 may also control whether or not to balance its respective cells 135 based on the relative capacitances for each of its individual cells 135. Accordingly, balancing of the string of modules 125 may occur using distributed control among the modules 125. Similarly, relative capacitance calculations for individual cells 135 and modules 125 may be performed by each module 125 independently of other modules 125 performing similar calculations.

The balancing circuits or other hardware in each module 125 may be limited to only being able to discharge cells 135. Thus, the balancing circuits, in operation, may be able to lower or reduce cell voltages of cells 135 in the module 125. In some embodiments, the balancing circuit of the module 125 may determine that a cell voltage for one or more cells 135 in the module 125 is less than the target voltage for the cells 135 in that module 125, as determined based on the calculated cell relative capacitance and the average cell/module voltage of the system 100. In such embodiments, there is a need to discharge the other cells 135 of the remaining modules 125 in the system 100. In systems with a large number of cells 135, the average cell/module voltage may not be low enough to trigger the other modules 125 to balance. Alternatively, the balancing circuit of the module 125 that determined that its cell voltage is too low may communicate the low cell voltage scenario to the rest of the system 100.

In systems with a large number of cells 135, the average cell/module voltage may be low enough to trigger the other modules 125 to balance. In some embodiments, the module 125 may signal the trigger to the system controller 105, which then passes the trigger to all modules 125 coupled to the system controller 105. In such embodiments, each module 125 determines target voltages for its cells based on the relative capacitances of the cells 135 and the average cell delta voltage between the voltage of the cell 135 and the target voltage of the cell 135 or module 125. When the module 125 determines that any of its cells 135 are above the target voltage, the module 125 balances those cells 135. When the module 125 determines that any of its cells 135 are below the target voltage by at least a threshold voltage (e.g., X mV, where X is a predetermined or dynamic mV value), the module 125 may send a bit (e.g., a balancing request bit) to the other modules 125 (e.g., directly or via the system controller 105. The module 125 may continue to discharge or balance its cells 135 until none of the modules 125 in the system 100 have a corresponding balancing request bit set (e.g., until all cells 135 are at or above their respective target voltages, or within the threshold voltage of the target voltage).

When one of the modules 125 determines that its cell voltage is too low, the module 125 may communicate its low cell voltage scenario to the rest of the system 100. Accordingly, each module 125 may determine its local cell target voltages based on the relative capacitances of its cells 135 and the average cell delta voltage between the voltage of the cell 135 and the target voltage of the cell 135 or module 125. The module 125 then translates or manipulates the local cell target voltages to determine an average module target voltage (AMTV) for the cells 135 of the module 125. The module 125 also determines a minimum AMTV in the module 125 and sends/communicates the minimum AMTV to other modules 125 of the system 100, via a communication infrastructure (e.g., via the system controller 105 or directly to each of the other modules 125). Each module 125 (or the system controller 105) may determine the minimum AMTV in the system 100 based on the received minimum AMTV from each module 125. Each module 125 may then use relative capacitances for each of its cells 135 to determine an adjusted cell target voltage based on the minimum AMTV across the system 100.

In some embodiments, the term AMTV corresponds to the average module voltage that the modules 125 in the string need to reach for the target system voltage to be reached. The AMTV may be determined using cell 135 and/or module 125 relative capacitances.

This communication is in our system design done by each CMS sending the average module voltage target (each cell target is normalized back to the system average) which enable all other CMS to adjusted/lowered their cell targets to account for the low cell voltage somewhere in the system. Other examples of solving this problem are centralized computation of cell targets or a delta voltage broadcasted through the system.

As noted above, the overall average cell voltage may be determined to be an overall maximum or minimum average cell voltage. In some embodiments, the overall average cell voltage may comprise an overall minimum AMTV based on the AMTVs received from each of the modules 125. The adjusted cell target voltage may be determined based at least in part on the minimum ATMV and may be used to balance the cells 135 of the modules 125.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions should not be interpreted as causing a departure from the scope of the embodiments.

The various illustrative blocks, modules, and circuits described in connection with the embodiments disclosed herein may be implemented or performed with a general purpose hardware processor, a Digital Signal Processor (DSP), an Application Specified Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the embodiments disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The hardware processor and the storage medium may reside in an ASIC.

For purposes of summarizing the disclosure, certain aspects, advantages and novel features have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

Various modifications of the above-described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. An apparatus for balancing cells, comprising:
a plurality of modules each comprising one or more cells, each cell at a respective cell voltage; and
a processing system communicatively coupled to each of the plurality of modules and configured to:
receive an average cell voltage value for each of the plurality of modules from each of the plurality of modules,
determine an overall average cell voltage for the plurality of modules,
cause each of the plurality of modules to determine a relative capacitance for each of its cells based on the overall average cell voltage, and
cause each of the plurality of modules to balance its cells to generate a system setpoint voltage between a maximum combined voltage of the plurality of modules or a combined voltage of zero volts based on the respective relative capacitances for each of the cells of the module, wherein the system setpoint voltage is dynamically adjusted.

2. The apparatus of claim 1, wherein the processing system is further configured to:
determine a maximum low voltage cell difference, and
establish the maximum low voltage cell difference as a constraint on the cells,
wherein the constraint causes a difference between a first cell having a maximum cell voltage of all the cells in the string of modules and a second cell having a minimum cell voltage of all the cells in the string of modules to be equal to or less than the maximum low voltage cell difference.

3. The apparatus of claim 1, wherein the processing system is configured to cause each of the plurality of modules to determine a relative capacitance for each of the cells of the module based on causing each of the cells to be charged to a maximum cell value and discharged to a minimum cell value.

4. The apparatus of claim 1, wherein the processing system is further configured to receive an indication from each of the plurality of modules that each of the cells of the plurality of modules is balanced.

5. The apparatus of claim 4, wherein the processing system is further configured to generate an instruction to each of the plurality of modules to discharge each of the cells of the plurality of modules to attain a maximum system voltage.

6. The apparatus of claim 1, wherein the processing system is further configured to generate an instruction to each of the plurality of modules to discharge each of the cells of the module to zero volts.

7. The apparatus of claim 6, wherein the processing system is configured to fully discharge each of the cells of each of the plurality of modules via one of a passive discharge component, an active discharge component, or a combination passive/active discharge component.

8. The apparatus of claim 1, wherein the processing system is configured to cause each of the plurality of modules to balance the cells of the module based on at least one of a discharge of excess positive cell voltages and a discharge of excess negative cell voltages.

9. The apparatus of claim 1, wherein the processing system is further configured to generate a request for the average cell voltage value from each of the plurality of modules.

10. The apparatus of claim 1, wherein the processing system is further configured to communicate the overall average cell voltage to each of the plurality of modules.

11. The apparatus of claim 1, wherein:
the average cell voltage comprises an average module target voltage (AMTV),
the overall average cell voltage comprises a minimum AMTV from the AMTVs received from each of the plurality of modules,
the processing system is further configured to cause each of the plurality of modules to determine an adjusted cell target voltage based on the minimum AMTV, and
the processing system causes each of the plurality of modules to balance the cells of the module based on the respective relative capacitances for each of the cells of the module and the adjusted cell target voltage.

12. A method of balancing cells, comprising:
receiving an average cell voltage value for each of a plurality of modules arranged in a string from each of the plurality of modules, each of the plurality of modules comprising one or more cells, each cell at a respective cell voltage;
determining, by a processing system, an overall average cell voltage for the plurality of modules;
causing, by the processing system, each of the plurality of modules to determine a relative capacitance for each of its cells based on the overall average cell voltage; and
causing, by the processing system, each of the plurality of modules to balance its cells to balance the cells comprises causing each of the plurality of modules to balance its cells to generate a system setpoint voltage between a maximum combined voltage of the plurality of modules or a combined voltage of zero volts based on the respective relative capacitances for each of the cells of the module,
wherein the system setpoint voltage is dynamically adjusted.

13. The method of claim 12, further comprising:
determining a maximum low voltage cell difference;
establishing the maximum low voltage cell difference as a constraint on the cells;
transmitting the constraint to each of the plurality of modules; and
causing a difference between a first cell having a maximum cell voltage of all the cells in the string of modules and a second cell having a minimum cell voltage of all the cells in the string of modules to be equal to or less than the maximum low voltage cell difference.

14. The method of claim 12, wherein causing each of the plurality of modules to determine a relative capacitance for each of the cells of the module comprises causing each of the cells to be charged to a maximum cell value and discharged to a minimum cell value.

15. The method of claim 12, further comprising:
receiving an indication that each of the cells of the plurality of modules are balanced, wherein the indications are received from each of the plurality of modules.

16. The method of claim 12, wherein causing each of the plurality of modules to balance the cells of the module comprises causing each of the plurality of modules to balance the cells of the module based on at least one of a discharge of excess positive cell voltages and a discharge of excess negative cell voltages.

17. The method of claim 12, wherein the average cell voltage comprises an average module target voltage (AMTV) and wherein the overall average cell voltage comprises a minimum AMTV from the AMTVs received from each of the plurality of modules, and further comprising causing each of the plurality of modules to determine an adjusted cell target voltage based on the minimum AMTV, wherein causing each of the plurality of modules to balance its cells based on the respective relative capacitances for each of its cells comprises causing each of the plurality of modules to balance its cells based on the respective relative capacitances for each of its cells and the adjusted cell target voltage.

18. A non-transitory computer readable medium comprising instructions stored thereon that when executed by at least one processor of a computing device cause the computing device to:
receive an average cell voltage value for each of a plurality of modules arranged in a string from each of the plurality of modules, each of the plurality of modules comprising one or more cells;
determine, by a processor of the computing device, an overall average cell voltage for the plurality of modules;
cause, by the processor, each of the plurality of modules to determine a relative capacitance for each of its cells; and
cause, by the processor, each of the plurality of modules to balance its cells to generate a system setpoint voltage between a maximum combined voltage of the plurality of modules or a combined voltage of zero volts based on the respective relative capacitances for each of its cells wherein the system setpoint voltage is dynamically adjusted.

* * * * *